United States Patent [19]

Degner et al.

[11] 4,220,612
[45] Sep. 2, 1980

[54] FLOTATION CELL FEED DUCT

[75] Inventors: Vernon R. Degner, Sandy, Utah; William V. Colbert, Sacramento, Calif.

[73] Assignee: Envirotech Corporation, Menlo Park, Calif.

[21] Appl. No.: 32,069

[22] Filed: Apr. 23, 1979

Related U.S. Application Data

[63] Continuation of Ser. No. 918,982, Jun. 26, 1978, which is a continuation of Ser. No. 695,881, Jun. 14, 1976, abandoned.

[51] Int. Cl.² .............................................. B03D 1/24
[52] U.S. Cl. ..................................... 261/76; 209/170; 210/221 P; 261/77; 261/DIG. 75; 261/123
[58] Field of Search .................. 261/76, 77, DIG. 75, 261/123; 209/168-170; 210/221 R, 221 M, 221 P; 239/419.3, 419.5, 422, 424, 424.5, 425, 425.5, 426; 366/101

[56] References Cited

U.S. PATENT DOCUMENTS

| | | | |
|---|---|---|---|
| 1,380,665 | 6/1921 | Lyster | 261/DIG. 75 |
| 2,651,413 | 9/1953 | Daman | 209/168 |
| 3,210,053 | 10/1965 | Boester | 261/87 |
| 3,400,818 | 9/1968 | Tarjan | 209/170 |
| 3,446,353 | 5/1969 | Davis | 209/170 |
| 3,491,880 | 1/1970 | Reck | 210/221 M |
| 3,833,719 | 9/1974 | Kuerten et al. | 261/DIG. 75 |
| 3,938,738 | 2/1976 | Nagel et al. | 261/DIG. 75 |
| 4,110,210 | 8/1978 | Degner et al. | 210/221 P |

Primary Examiner—Frank W. Lutter
Assistant Examiner—Gregory N. Clements
Attorney, Agent, or Firm—Hal J. Bohner; Robert E. Krebs

[57] ABSTRACT

A machine which utilizes hydraulic effects to disperse gas bubbles throughout a contained liquid includes a feed duct mounted to introduce raw liquid into the contained liquid. The feed duct comprises a first hollow tubular member into which a stream of processed liquid is pumped. A second hollow tubular member is affixed outside, and concentric with, the first tubular member so that space is formed around the open end of the first tubular member. Raw liquid is introduced into the space between the two members, and the processed liquid aspirates the raw liquid through the feed duct.

8 Claims, 5 Drawing Figures

FLOTATION CELL FEED DUCT

This application is a continuation in part of U.S. patent application Ser. No. 918,982 filed June 26, 1978, which is a continuation of application Ser. No. 695,881 filed June 14, 1976 and now abandoned.

BACKGROUND OF THE INVENTION

1. Field of the Invention

The present invention generally relates to improved apparatus for dispersing gas bubbles throughout a liquid body.

2. State of the Art

It is well known to distribute gas bubbles in a liquid body in order to accomplish, for example, a solid-liquid or liquid-liquid separation by flotation. Such flotation techniques are commonly used for separating and concentrating valuable minerals and chemicals, for removing particulates such as coal fines from liquid bodies and for separating various liquids. A typical flotation process in the mineral beneficiation art, for example, includes the steps of conditioning an aqueous pulp or slurry of crushed ore with a chemical flotation aid and then dispersing air bubbles within the pulp to produce a surface froth relatively rich in the desired mineral. In the field of oil production, similar flotation processes are frequently used to separate crude oil from water prior to the reinjection of the water into a well or prior to surface disposal of the water.

There are also a number of other processes wherein it is necessary to distribute gas bubbles within a liquid. Examples include processes for liquid carbonation and aeration, for biological solids flotation, for stripping gases from liquids, for the acceleration of fermentation, and for the mixing of gases and liquids. A general requirement for those processes, and for flotation processes as well, is that the gas bubbles in the liquid body be small and well distributed.

Various machines have been proposed to satisfy the aforementioned requirements, especially in the field of flotation. In one well known type of flotation machine, a rotatable impeller is provided to aspirate gas into a liquid body in a vessel and, at the same time, to agitate the liquid to distribute the gas. One such machine is shown in U.S. Pat. No. 3,491,880 to Reck, and another is shown in U.S. Pat. No. 2,651,413 to Daman. Another type of flotation machine utilizes one or more gas injection nozzles in combination with a baffle arrangement to distribute gas within a liquid body. Machines generally of that type are shown in U.S. Pat. Nos. 3,371,779 to Hollingsworth et al, and 3,446,353 to Davis.

Another type of flotation machine for mineral applications is the cascade machine; cascade machines, which were historically of a quite small cell volume, have been obsolete for many years. An example of a cascade machine is shown in U.S. Pat. No. 1,380,665 to Lyster.

OBJECTS OF THE INVENTION

The general object of the present invention is to provide an improved machine for dispersing gas into a liquid body.

Another object of the present invention is to provide a flotation machine wherein the conventional feed box is eliminated and, instead, hydraulic aspiration is utilized to introduce feed material into the flotation machine.

Further objects and advantages of the present invention may be readily ascertained by reference to the following description and appended drawings, which are offered by way of illustration only and not in limitation of the invention, whose scope is defined by the appended claims and equivalents.

DETAILED DESCRIPTION OF THE PREFERRED EMBODIMENT

The machine which will be described in the following is for dispersed gas flotation. As distinguished from dissolved gas flotation, dispersed gas flotation achieves physical separation of a contaminating substance from a body of primary liquid by effecting contact between the contaminating substance, which may be either solid particles or a second liquid, and gas bubbles without first dissolving the gas in the primary liquid. Having achieved contact, the contaminating materials attach to the gas bubbles and rise buoyantly to the surface of the primary liquid as a froth which can be subsequently removed, as by skimming. In dispersed gas flotation systems, it is important to achieve small gas bubbles (i.e., high surface-to-volume ratio), good mixing to assure high gas-particle contact probability, minimum short-circuiting of the primary liquid, and a highly concentrated contaminant level in the removal stream.

Figure 1:
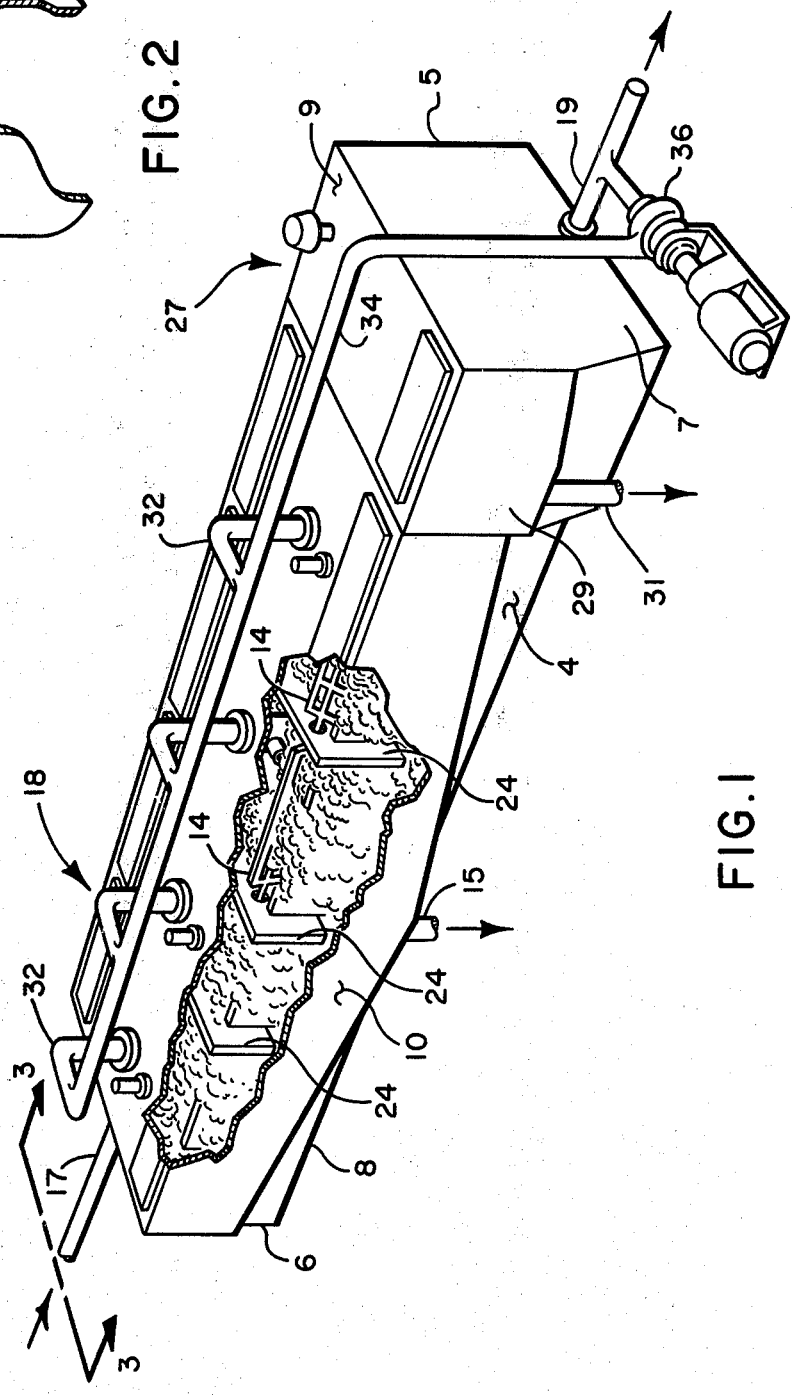
FIG. 1 is a schematic diagram of a flotation machine according to our invention.
Figure 3:
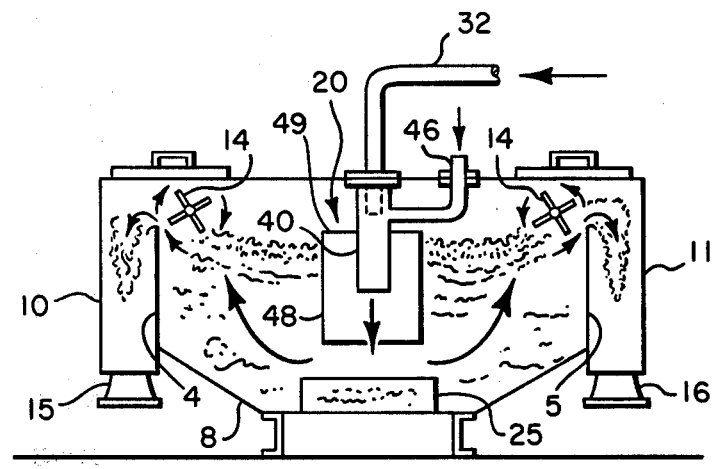
FIG. 3 is a sectional view of the machine of FIG. 1.

The dispersed gas flotation machine in FIGS. 1 and 3 generally includes sidewalls 4 and 5, endwalls 6 and 7, a floor 8 and an optional roof 9 which together comprise a housing. Within the housing, flotation cells or compartments are arranged in a horizontal series for holding the liquid to be treated. The sidewalls terminate below the roof 9 and their upper horizontal edges serve as overflow weirs to discharge froth from the cells into elongated launder boxes 10 and 11 mounted on the sidewalls 4 and 5 respectively. Preferably, conventional rotary paddle wheel devices 14 are mounted adjacent the edges of the sidewalls 4 and 5 to urge froth to discharge over the sidewalls into the collection launders 10 and 11, from which the froth is carried to discharge via conduits 15 and 16. The paddle wheel drive means is well known and is omitted from the drawings for purposes of clarity. An inlet conduit 17 is mounted through the endwall 6 of the housing to admit an influent stream of liquid for processing into the first flotation compartment 18 of the series. At the opposite end of the machine, an outlet conduit 19 for discharging treated liquid from the machine is fitted through the endwall 7.

Cell 18, the left-most cell in the series, generally comprises a compartment wherein is mounted a feed duct 20 for introducing a gas-liquid mixture into the contained liquid and for aspirating a stream of untreated liquid into the cell. The illustrated compartment of cell 18 is rectangular in shape, being comprised of the housing sidewalls 4 and 5, the housing floor 8, and end partition walls 24 mounted transversely between the housing sidewalls 4 and 5. There is an underflow of liquid out of the cell via opening 25 formed through a partition wall just above the floor 8; this manner of transferring liquid from cell to cell in a flotation machine is well known, and the openings 25 are usually called underflow weirs. Each of the cells downstream of the first cell 18 is defined by a pair of partition walls 24, the housing sidewalls 4 and 5, and the floor 8. An underflow opening 25 is provided in each of the partition walls 24 to permit liquid to flow from cell to cell toward the right, according to FIG. 1. A two-phase ejection device 26 is mounted in each of the cells other than the first cell 18 for introducing a gas-liquid mixture into the liquid contained in the cell to form a froth on the liquid surface.

The particular illustrated machine also includes an integral skimming compartment 27 which receives treated liquid via an underflow weir from the last flotation cell of the series. The skimming compartment 27 can be understood to be identical to a flotation cell except that it does not contain a two-phase fluid ejection device 26. In the illustrated embodiment, the skimming compartment 27 includes a separate launder box 29 for receiving froth from the compartment, which froth is carried to discharge via a conduit 31. It should also be understood that there is a skimming device mounted in the skimming compartment to urge froth into the launder box 29. Treated liquid is discharged from the skimming compartment via the outlet conduit 19.

Conventionally, machines of the aforedescribed type include a separate compartment, usually called a feed box, which initially receives the raw liquid. The feed box contains no means to disperse air into the liquid and therefore no froth is formed in and removed from the feed box. From the feed box the raw liquid is distributed into the first of a series of flotation cells, usually via an underflow launder.

In contrast to conventional machines having a feed box, the present embodiment lacks a feed box and includes feed duct 20 for introducing raw liquid into the first cell 18. The feed duct 20 is fixedly mounted centrally in the first cell 18 to eject a gas-liquid mixture downwardly into the liquid body and to aspirate a stream of untreated liquid into the first cell. Thus it can be appreciated that the feed duct 20 permits liquid to be introduced into the first flotation cell without the necessity of introducing the liquid first into a feed box. Consequently substantial conservation of space is realized. Moreover, gas is rapidly and effectively mixed with the raw waste in the duct 20 to enhance the production of bubbles in the liquid body in the cell 18. It should be appreciated that this mixing is accomplished without the necessity for directing the gas-liquid mixture against a baffle, although prior art devices employ baffles for mixing.

The duct 20 is connected via liquid carrying branch pipe 32, to a manifold pipe 34. Also, the two-phase ejection devices 26 are also coupled to the manifold pipe 34 to receive liquid therefrom. A pump 36 is connected to the main manifold pipe 34 to force liquid therethrough and then into the ejection devices 26 and duct 20. As will now be explained, the pumped liquid mixes with gas in the duct 20 and ejection devices 26 to form a two-phase fluid. The liquid pumped to the manifold pipe 34 can be a fraction of the processed liquid discharged through pipe 19.

Figure 2:
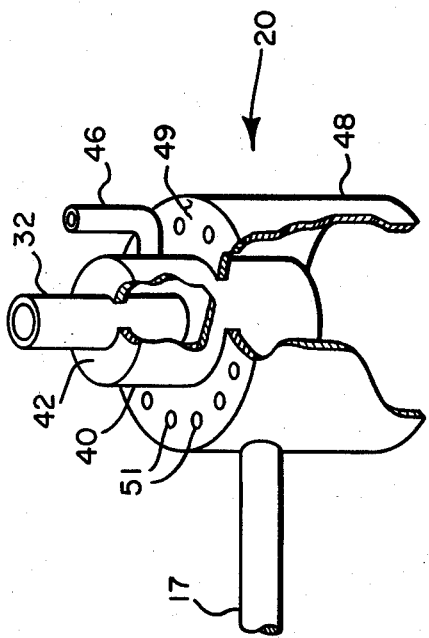
FIG. 2 is a detail shown partly cut away, of one part of the machine shown in FIG. 1.

As best shown in FIG. 2, the duct 20 preferably includes a hollow straight tubular member 40 which is circular in interior cross-section, has uniform inside diameter and an open, unobstructed end. An annular plate 42 having a central aperture is sealingly fixed to the upper end (hereinafter called the inlet end) of the tubular member 40. The associated branch pipe 32 is sealingly fitted through the annular plate 42 and extends concentrically into the interior of the tubular member 40 to thereby define an annular space between the exterior wall of the pipe 32 and the interior wall of the tubular member 40. The radial width of the annular space may range from about 20 to 80% of the interior diameter of the tubular member; the preferred range is 20 to 25%. An aperture is formed through the sidewall of the tubular member 40 to communicate with the annular space, and a gas-carrying conduit 46 is sealingly fitted into the aperture to convey gas into the annular space. The gas-carrying conduit 46 extends from the duct 20 for connection to a source of pressurized gas or to an outlet which is in gaseous flow communication with the atmosphere outside the housing of the flotation machine.

The space within the tubular member 40 between the end of the liquid-carrying branch pipe 32 and the discharge end of the tubular member 40 defines an expansion chamber. The discharge end of the expansion chamber is open and unobstructed. In practice, the ratio of the inside diameter of the expansion chamber to the inside diameter of the branch pipe 32 ranges from about 1.5 to about 3.5 and, preferably, the ratio is at least 2. Further, the length of the expansion chamber is at least twice its diameter and may be twenty or more times its diameter in some applications, such as for gas-liquid contacting; the preferred ratio of the length of the expansion chamber to its inside diameter ranges from about 2 to about 15.

A second hollow, straight tubular member 48 is located concentric to and outside the first tubular member 40. The tubular member 48 is circular in cross section and is open at its lower end with its upper end sealingly coupled to the first tubular member 40 by an annular plate 49 at about the vertical mid point of the first tubular member 40. A plurality of ports 51 are formed in the annular plate 49 to permit gas flow into the interior of the tublar member 48. The liquid inlet pipe 17 is coupled to the second tubular member 48 for introducing raw liquid thereinto.

Figure 4:
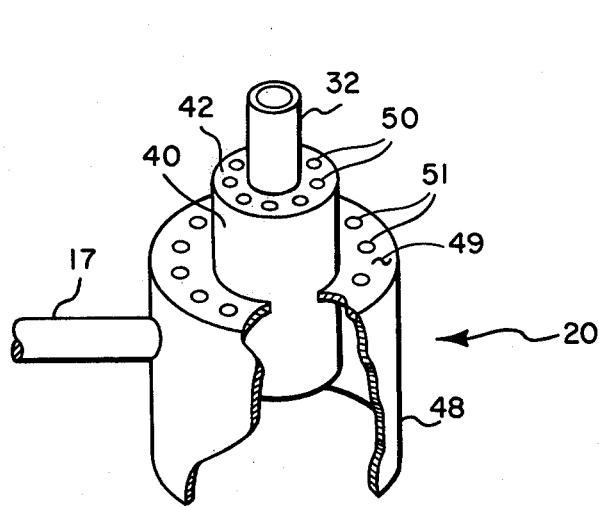
FIG. 4 is another detail, shown partly cut away, of a part of the machine of FIG. 1.

It should be understood that there are alternative constructions of the feed duct 20. For example, as shown in FIG. 4, the branch pipe 32 does not extend into the tubular member 40, but terminates at the annular plate 42. Also, a plurality of ports 50 are formed in the annular plate 42 to permit gas introduction, and no conduit 46 is utilized.

Although the FIG. 3 embodiment shows the duct 20 positioned to expel two-phase fluid downwardly into the liquid-holding vessel 18, the duct can be positioned to eject at some oblique angle into the tank.

To operate the duct 20, liquid is pumped at a pressure of, say 3 to 15 psig, through the manifold pipe 34 and then through the branch pipe 32 into the tubular member 40. Upon entering the tubular member 40, the pumped liquid creates a low-pressure turbulent region, and the low pressure aspirates gas into the expansion chamber from the aforementioned annular space in the expansion chamber. Although natural aspiration from the atmosphere usually draws enough gas into the duct to satisfy the operating parameters described hereinafter, a source of pressurized gas can be connected to the gas-carrying pipe 46. The mixture of gas and liquid then flows downward from the tubular member 40 into the second tubular member 48. This flow of liquid and gas aspirates raw liquid from pipe 17 into the tubular member 48 to mix with the gas-liquid mixture, and gas is aspirated through the ports 51. The mixture then flows into the first cell 18 for treatment.

It can be appreciated that according to the present invention the raw liquid is aspirated into the first cell 18 by a stream of liquid pumped via pump 36. In contrast, the prior art system according to U.S. Pat. No. 3,446,353 to Davis, requires that all of the raw liquid be pumped at high pressure into the flotation cell.

The ejection devices 26 are constructed and operated much the same as the inlet duct 20. A single one of the ejection devices 26 is fixedly mounted centrally at the free liquid surface in each of the cells, other than the first, to eject a two-phase fluid (e.g. an air-water mixture) downwardly into the liquid body from below the liquid surface. Each of the ejection devices 26 is connected, via liquid carrying branch pipe 32, to the manifold pipe 34. The pump 36 is connected to the manifold pipe to force liquid therethrough and then into the ejection devices 26. The pumped liquid mixes with gas in the ejection devices 26 to form the aforementioned two-phase fluid. As shown, the liquid pumped to the ejection devices 26 can be a fraction of the processed liquid discharged through pipe 19.

In practice, to insure optimum operation, the machine of FIG. 1 is operated such that a predetermined relationship is maintained among the volume of each cell, the rate at which liquid is expelled through pipe 32 and the geometry of the ejection devices 26. The predetermined relationship is discussed in detail in our U.S. Pat. No. 4,110,210 issued Aug. 29, 1978.

Figure 5:
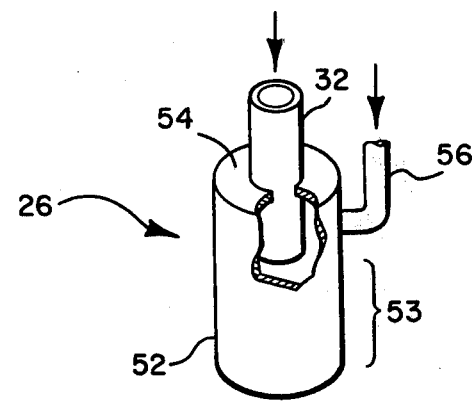
FIG. 5 is another detail, shown partly cut away, of a part of the machine of FIG. 1.

As best shown in FIG. 5, each of the ejection devices 26 preferably includes a hollow straight tubular member 52 which is circular in interior cross-section, has uniform inside diameter and an open, unobstructed end. An annular plate 54 having a central aperture is sealingly fixed concentrically to the upper end of the tubular member 52 (hereinafter called the inlet end). The free end of the associated branch pipe 32 is sealingly fitted through the annular plate 54 and extends concentrically into the interior of the tubular member 52 to thereby define an annular space between the exterior wall of the pipe 32 and the interior wall of the tubular member 52. An aperture is formed through the sidewall of the tubular member 52 to communicate with the annular space and gas-carrying conduit 56 is sealingly fitted into the aperture to convey gas into the annular space. The gas-carrying conduit 56 extends from the ejection devices 26 for connection to a source of pressurized gas or to an outlet which is in gaseous flow communication with the atmosphere above the liquid surface or outside the housing of the flotation machine.

The space within the tubular member 52 between the end of the liquid-carrying branch pipe 32 and the discharge end of the tubular member 52 defines an expansion chamber 53. The discharge end of the expansion chamber 53 is open and unobstructed.

The above-described two-phase fluid ejection device is described more fully in our U.S. patent application Ser. No. 918,982, filed in the Patent Office June 26, 1978. Another type of fluid ejection device is described in our U.S. Pat. No. 4,110,210 issued Aug. 29, 1978. In certain applications the fluid ejection device described in this patent can be substituted for the fluid ejection devices 26.

To operate fluid ejection devices 26, liquid is pumped through the manifold pipe 34 and then through the branch pipe 32 into the expansion chamber 53. Upon entering an expansion chamber 53, the pumped liquid creates a low-pressure turbulent region, and the low pressure aspirates gas into the expansion chamber from the aforementioned annular space in the expansion chamber. Although natural aspiration from the atmosphere usually draws enough gas into the ejection device to satisfy the operating parameters described hereinafter, a source of pressurized gas can be connected to the gas-carrying pipe 56.

The operation of the present flotation machine can now be understood. Initially raw liquid to be treated is introduced via pipe 17 into the feed duct 20 and thence into the first cell 18. Liquid is pumped through the duct 20, and air is mixed therewith to form a two-phase mixture which is ejected into the cell 18. The air mixed with the liquid in the cell forms bubbles which rise to the surface carrying materials which are skimmed off and disposed of. The partly treated liquid flows from the first cell 18 to the next cells in the series via ports 25. In the remaining cells the liquid is mixed with the two-phase mixture issuing from ejection devices 26, and froth is removed from the liquid surface. After treatment in the series of cells the liquid is removed via line 19 and part is recycled with the remainder transferred to a receiving water or further treatment.

We claim:

1. A dispersed gas flotation machine for dispersing gas bubbles throughout contained liquid comprising:
   a. a housing and a plurality of flotation cells, mounted adjacent one another in a horizontal series to form at least a first cell and a last cell in said housing and each of said cells containing a liquid body;
   b. means for transferring liquid from cell to cell;
   c. means connected to said housing for introducing liquid for processing thereinto, said introduction means including a feed duct located only in said first cell of said plurality of cells and having:
      (i) a first hollow tubular member which has a first end and an open end through which a mixture of gas and liquid is expelled and which is of substantially constant diameter throughout its length;
      (ii) a second hollow tubular member coupled to said first hollow tubular member to form a space between said first and second hollow tubular members around the open end of said first tubular member said second tubular member having a substantially constant diameter throughout its length;
      (iii) means for introducing raw liquid into the space between said first and second hollow tubular members;
      (iv) a liquid-carrying pipe sealingly connected in communication with said first end of said first tubular member, said liquid-carrying pipe extending inside said first tubular member substantially less than length of said first tubular member so that an expansion chamber is formed between the open end of said liquid-carrying pipe and the open end of said first tubular member; and
      (v) gas introduction means for introducing gas into the interior of said expansion chamber for mixing with the liquid in said expansion chamber;

d. removal means for removing processed liquid from said housing;

e. means for removing froth from the surface of the liquid in said housing;

f. a plurality of fluid ejection devices mounted one in each of said flotation cells other than said first cell in a position to expel a mixed fluid into the liquid contained in each said cell;

g. pump means connected to said liquid-carrying pipe and to said fluid ejection devices to pump liquid into said fluid ejection devices and into said feed duct.

2. A machine according to claim 1 wherein said gas introduction means includes a pressure source connected in gas flow communication with said first hollow tubular member to introduce gas under pressure into the interior of said member.

3. A machine according to claim 1 wherein the ratio of the inside diameter of said expansion chamber to the inside diameter of said pipe ranges from about 1.5 to 3.5.

4. A machine according to claim 1 wherein the ratio of the length of said expansion chamber member to its inside diameter is at least 2.

5. A machine according to claim 1 wherein said ratio of the length of said expansion chamber member to its inside diameter ranges from 2 to 15.

6. A machine according to claim 1 wherein said liquid-carrying pipe terminates at the first end of said first tubular member.

7. A machine according to claim 1 including recycle means to convey a pressurized stream of processed liquid from said removal means to said fluid ejection devices.

8. A machine according to claim 7 including recycle means to convey a pressurized stream of processed liquid from said removal means to said liquid-carrying pipe of said introduction means.

* * * * *